H. PERCIVAL.
Manufacture of Glass.
No. 155,887. Patented Oct. 13, 1874.
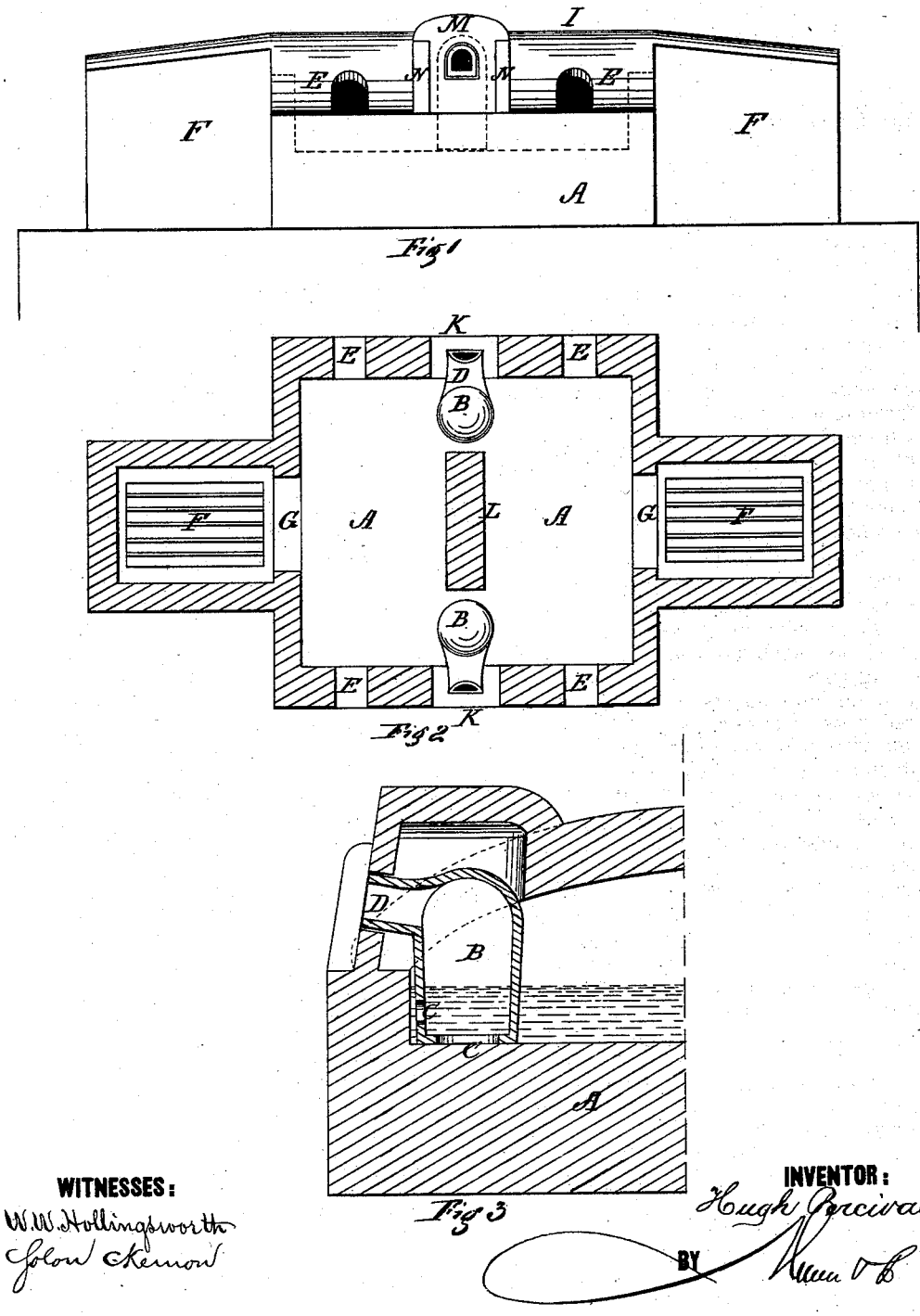
WITNESSES:
INVENTOR:
Hugh Percival
BY
ATTORNEYS.

UNITED STATES PATENT OFFICE.

HUGH PERCIVAL, OF BISHOP WEARMOUTH, ENGLAND.

IMPROVEMENT IN THE MANUFACTURE OF GLASS.

Specification forming part of Letters Patent No. 155,887, dated October 13, 1874; application filed September 18, 1874.

*To all whom it may concern:*

Be it known that I, HUGH PERCIVAL, of Bishop Wearmouth, in the county of Durham, England, have invented a new and useful Improvement in the Manufacture of Glass; and I do hereby declare that the following is a full, clear, and exact description of the same, reference being had to the accompanying drawing forming a part of this specification.

My invention relates to improvements in the manufacture of flint glass, or other kinds of glass that may be worked from or out of covered pots or coverings.

The object of my invention is to effect a material saving in pots, in time, in labor, and in fuel, and to afford a larger supply of refined glass, and insure a greater uniformity of working, besides effecting a reduction of unproductive labor, such as skimming, or mending, or setting pots.

My invention consists in the adaptation of covered pots or coverings to be used in connection with ordinary tanks, and also in the adaptation of ordinary tanks to be worked in connection with covered pots or coverings.

In order that my invention may be more readily understood, I have illustrated it in the accompanying drawing, in which—

Figure 1 shows an elevation, and Fig. 2 a horizontal section, of one tank with the pots placed therein. Fig. 3 is a vertical section, taken on line 1 1, Fig. 1, of one-half the tank on a larger scale, showing also a section of a covered pot as employed by me in carrying out my invention.

A A is the tank or tanks constructed with one or more openings, K K, on each side of the crown, through which the covered pots or coverings B B must be placed, inside of the tank, as shown. The covered pots or coverings B B are somewhat like those used in the manufacture of flint glass, but have an opening, C, (or openings,) in the bottom or side (near the bottom) of each for the refined glass to flow in at from the tank, as well as the mouth D, from which the refined glass may be gathered. The pots are stood upon the bottom of the tank, so that the opening or openings C will always be below the level of the surface of the glass in the tank, and the refined glass surrounding the lower part of the pot flows into the latter, which is thus constantly kept filled to the same level as the glass in the tank. The covering or dome of the pot is intended to protect the refined glass contained therein from the direct flame of the furnace, or anything that might injure the quality of the refined glass while it is being manufactured into merchantable articles, the opening or openings C in the bottom or sides of the pot being intended to allow the refined glass to be worked from the bottom of the tank instead of from the top, whereby the quality of the glass is improved, as neither "seed," nor "boil," nor anything that may deteriorate the quality of the refined glass can descend to the bottom of the tank so long as it is kept nearly full of refined glass. E are the ordinary founding-holes through which the raw material is supplied to the tank, the refined glass being worked into merchantable articles from the holes D of the covered pots or coverings, as before mentioned. F F are the furnaces or fire-boxes; G, the sill or bridge separating the fire-box from the tank, and over which the flame passes into the tank; H, the side walls of the tank supporting the crown I. All these parts last enumerated are constructed in the ordinary manner, but to support that portion of the crown which extends from the opening K on the one side to the other opening K on the other side, and which would otherwise be weakened by the said openings, I would erect a pillar, L, from the bottom A of the tank to the crown above, but the crown may be otherwise strengthened, if preferred. The openings K are each inclosed by a cover, M, through an aperture in the front of which the mouth D of the pot B projects, as shown, the said cover being held securely by cheeks N N at either side of the opening K. The tank A may be constructed of any suitable dimensions, but should a larger supply of glass be needed than can be contained in one tank, in the manufacture of sheet-glass, for instance, one or more other tanks could be added to the tank wherein the covered pots or coverings are placed, the several tanks being connected to the one in which the pots are contained by conduits at or near the bottom, so as to be below the surface of the glass in the tanks. Through these conduits the refined glass can flow from the one tank to the other, until it reaches the tank in which the pots are placed, so that any desired quantity of glass can be made and refined at the same time that it is being worked from the pots.

The advantages resulting from my invention are—

First, the covered pots or coverings are only about one-eighth the size of the pots now in use.

Second, only two of the covered pots or coverings need be used in the tank or furnace at one time, although I reserve the right to use more than two if desirable, instead of eight, as now used.

Third, the covered pots or coverings being small, and having an equal pressure of the glass in the inside and outside, will last much longer than the pots as now used, since the latter have an internal pressure of about sixteen hundred weight, while the whole of the outside surface is exposed to the direct flame of the furnace.

Fourth, should the covered pots or coverings be broken or worn, and rendered useless, no glass will be lost in consequence, as they can be removed from the tank at any time, their contents flowing into the tank, and remaining there for use.

Fifth, the tank used in connection with these covered pots or coverings need only be about ten inches deep instead of eighteen inches, thus relieving the bridge or sill from much pressure.

Sixth, the tank being nearly always full of refined glass, the heat from it will add largely to that of the furnace also.

Seventh, the raw material will be melted and refined in layer instead of in mass, and consequently will be melted and refined with great rapidity, owing to the intense heat of the furnace above and the molten glass below. By this means an economy of about one-half will be effected, in time, in labor, and in fuel.

Eighth, the tanks being reduced in depth, and being nearly always full of refined glass, will raise the temperature of the furnace sufficiently to consume its own smoke. Thus the color of the refined glass will be pure as if melted and refined exclusively in close or covered pots, as is done at present in the manufacture of flint glass.

Ninth, by the use of the covered pots or coverings, the raw material can be melted and refined, and manufactured into merchantable articles simultaneously without dividing the tanks into compartments for that purpose.

Tenth, by using these covered pots or coverings, the tank or furnace can be kept at a uniform heat, and made to last much longer than those at present in use.

Eleventh, the thickness of the covered pots or coverings will regulate the temperature of the refined glass contained in them while being manufactured into merchantable articles.

Twelfth, the covered pots or coverings may be used in the manufacture of green or black bottles, also that of sheet glass, as any degree of heat can be obtained, and regulated as last above described.

Having thus described my invention, what I claim as new is—

1. The combination with tanks A, having openings K, of one or more covered pots, B, placed within a tank, as herein shown and described, the said pots or coverings being constructed with an opening at or near the bottom for the inflow of refined glass, as well as an opening at the upper part, where the glass is gathered and worked into merchantable articles, all as herein set forth.

2. The combination of two or more tanks, connected together, and with the tank containing the pots, by conduits below the surface of the glass, as specified.

The above specification of my invention signed by me this 8th day of August, 1874.

HUGH PERCIVAL.

Witnesses:
 COLLIN SMART,
 THOMAS LAMB.